United States Patent
McSherry et al.

(10) Patent No.: US 6,829,871 B1
(45) Date of Patent: Dec. 14, 2004

(54) WEDGE ANCHOR FOR CONCRETE

(75) Inventors: Thomas W. McSherry, Sinking Spring, PA (US); Pierre McDuff, Outremont (CA)

(73) Assignee: Cobra Fixations CIE LTEE-Cobra Anchors Co., Ltd., Montreal (CA)

( * ) Notice: Subject to any disclaimer, the term of this patent is extended or adjusted under 35 U.S.C. 154(b) by 0 days.

(21) Appl. No.: 09/857,403

(22) PCT Filed: Dec. 1, 1999

(86) PCT No.: PCT/CA99/01129

§ 371 (c)(1),
(2), (4) Date: Sep. 17, 2001

(87) PCT Pub. No.: WO00/32946

PCT Pub. Date: Jun. 8, 2000

Related U.S. Application Data

(60) Provisional application No. 60/110,530, filed on Dec. 1, 1998.

(51) Int. Cl.[7] .................................................. E04C 5/12
(52) U.S. Cl. ............................ 52/705; 52/157; 52/161; 52/165; 403/368; 405/259.3; 411/50; 411/55; 411/60.2; 411/64; 411/67
(58) Field of Search ......................... 52/157, 161, 165, 52/705; 411/50, 51, 55, 60.1, 64, 65, 66, 72, 73, 77, 57.1, 60.2, 61, 62; 405/259.3, 259.1; 403/349, 368, 361, 362

(56) References Cited

U.S. PATENT DOCUMENTS

| | | |
|---|---|---|
| 2,647,431 A | 8/1953 | Lewis |
| 2,783,673 A | 3/1957 | Lewis et al. |
| 2,787,931 A | 4/1957 | McCabe |
| 3,250,170 A | 5/1966 | Siegel |
| 3,257,891 A | 6/1966 | Lerich |
| 3,620,120 A | 11/1971 | Warner |
| 4,015,505 A | * 4/1977 | Murray ........................ 85/77 |
| 4,100,748 A | 7/1978 | Hansen |
| 4,158,983 A | * 6/1979 | Amico ........................ 85/76 |
| 4,337,012 A | 6/1982 | Sohnius |

(List continued on next page.)

FOREIGN PATENT DOCUMENTS

| | | |
|---|---|---|
| DE | 2 256 822 | 6/1974 |
| FR | 1 121 145 | 7/1956 |
| FR | 1 327 260 | 4/1963 |
| FR | 2 349 759 | 11/1977 |
| GB | 725291 | 3/1955 |
| GB | 1089510 | 11/1967 |
| GB | 1113394 | 5/1968 |
| GB | 2 153 949 | 8/1985 |

*Primary Examiner*—Carl D. Friedman
*Assistant Examiner*—Yvonne M. Horton
(74) *Attorney, Agent, or Firm*—Akerman Senterfitt

(57) ABSTRACT

An expansion wedge anchor (80) for insertion in a hole (H) delimited by a wall comprises an expander member (32) and an expansion number (34), the expander member being provided at a leading end of the expander member, the expander member comprising a flaring end (40), the expansion member being expandable at a trailing end (48) thereof and being adapted to engage the wall of the hole when the expander member is positioned in the hole, wherein upon longitudinal withdrawal of the expander member from the hole, the expander member displaces longitudinally relative to the expansion member with the flaring end thereof gradually causing the trailing end of the expansion member to expand, whereby a trailing edge of the expansion member engages the wall of the hole. The trailing end is adapted, when expanded by the flaring member, to extend at an angle with respect to a longitudinal axis of said expander member. In the method of setting the expansion wedge anchor in the hole, the following steps are found: (a) providing an expander member and an expansion member; and (b) displacing the expander member such as to cause a trailing end of the expander member to engage the wall of the hole.

28 Claims, 16 Drawing Sheets

U.S. PATENT DOCUMENTS

| | | |
|---|---|---|
| 4,403,894 A | 9/1983 | Clark |
| 4,408,937 A | 10/1983 | Hainke et al. |
| 5,028,188 A | 7/1991 | Prince |
| 5,087,160 A * | 2/1992 | Pezzuto .................... 411/5 |
| 5,094,577 A * | 3/1992 | Clark et al. ................ 411/64 |
| 5,316,414 A * | 5/1994 | Wright .................... 405/259.6 |
| 5,344,257 A | 9/1994 | Wright et al. |
| 5,352,066 A | 10/1994 | Schaeffer et al. |
| 5,762,451 A * | 6/1998 | Stankus et al. .......... 405/259.1 |
| 5,846,041 A * | 12/1998 | Bevan et al. ................ 411/65 |

\* cited by examiner

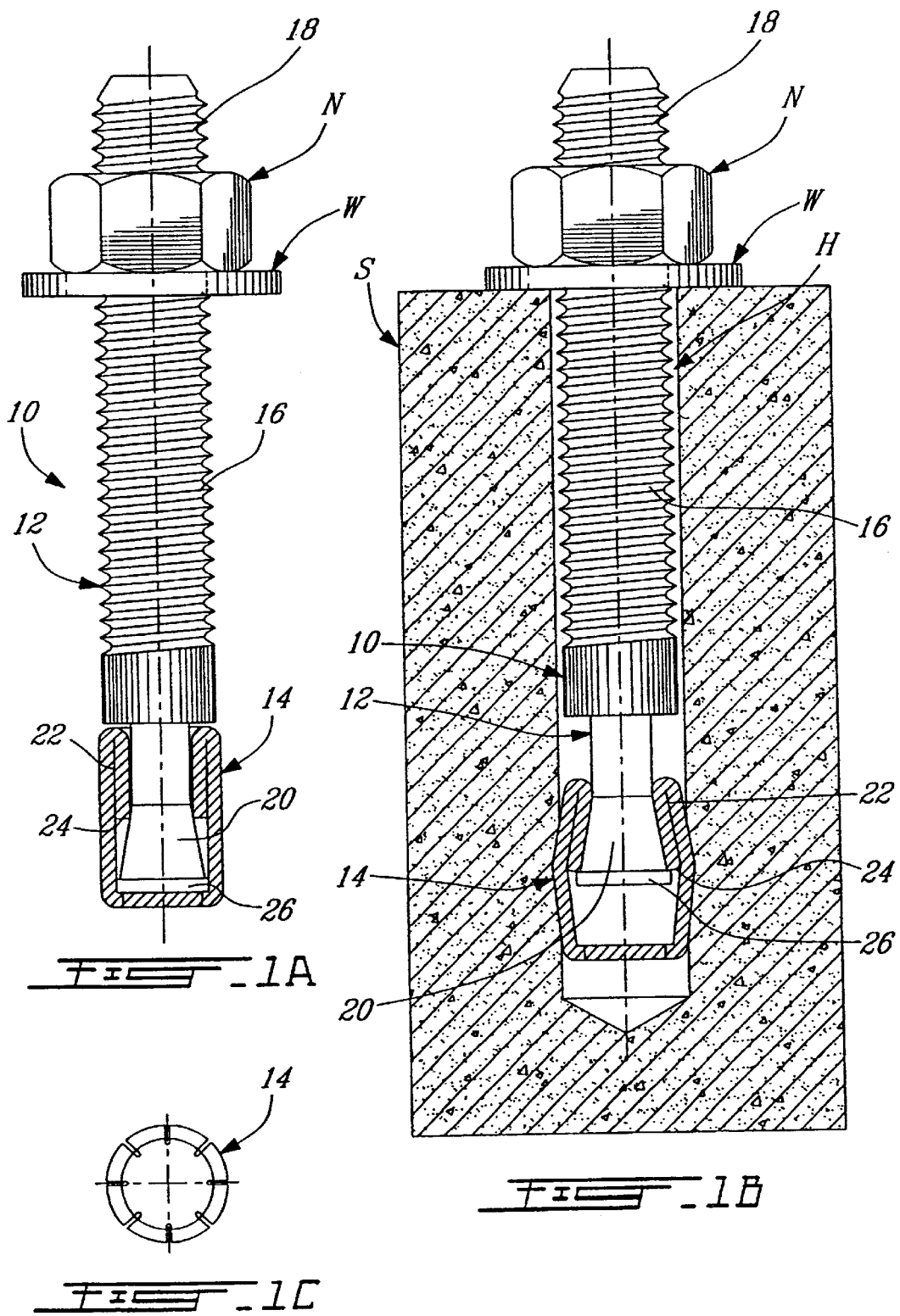

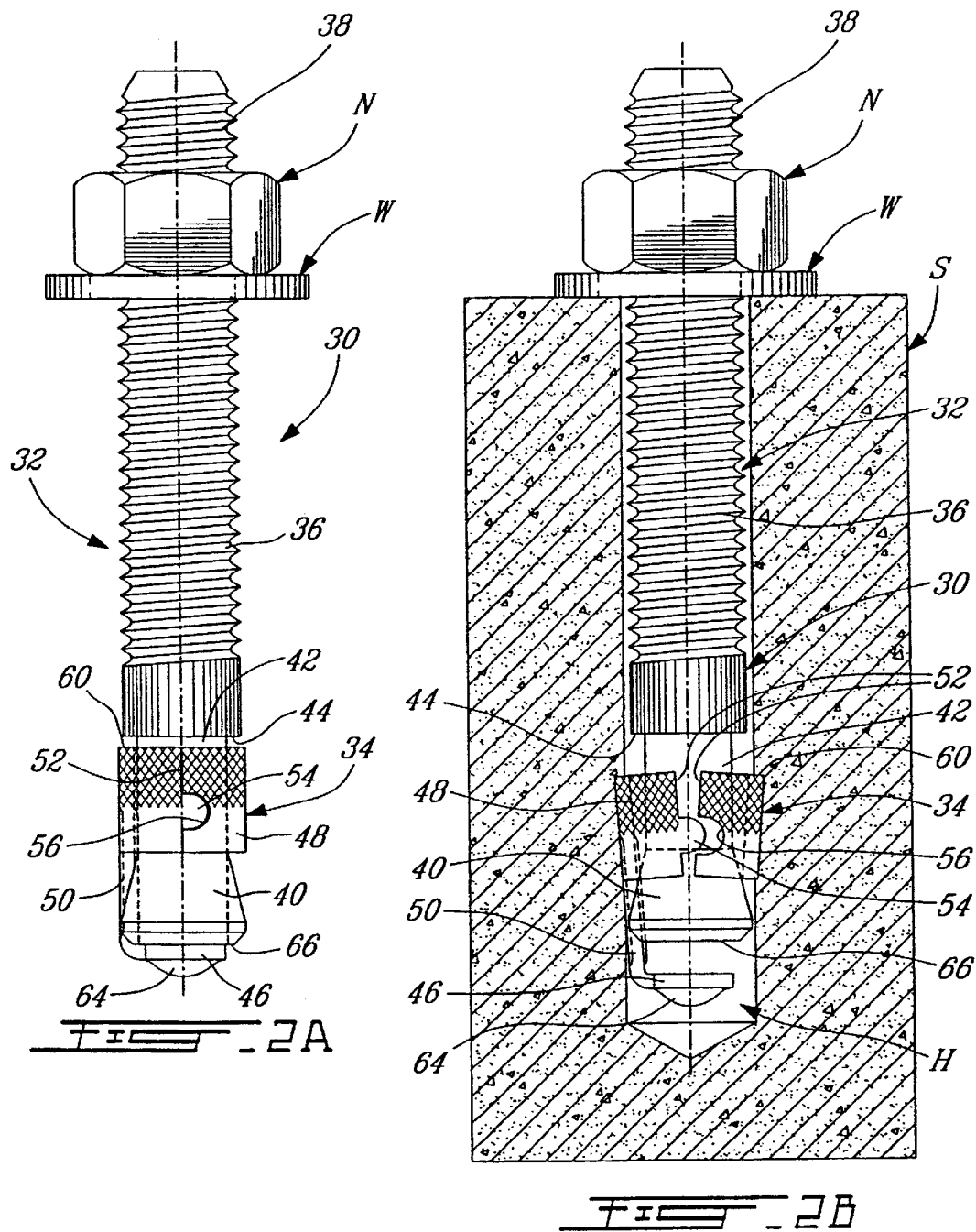

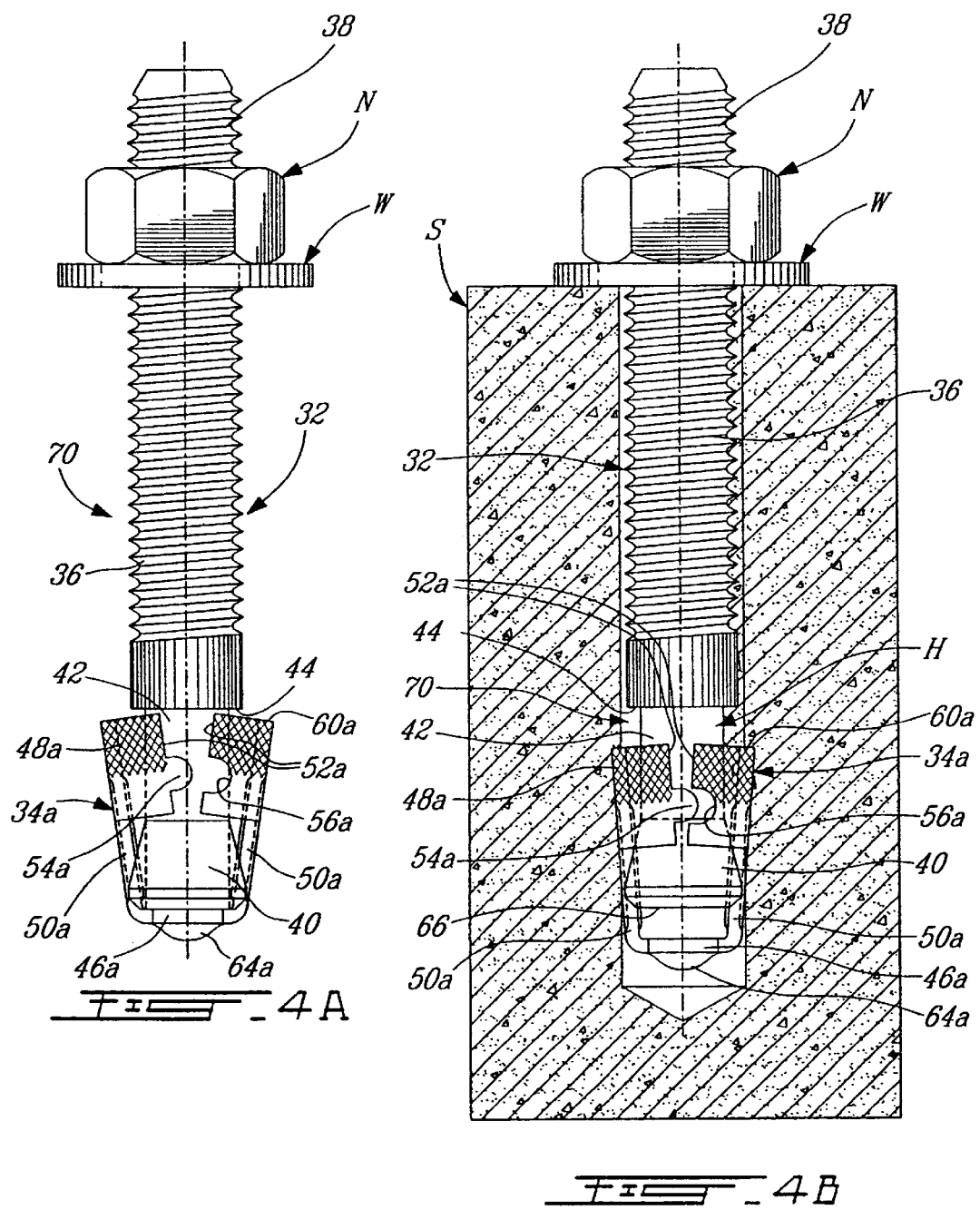

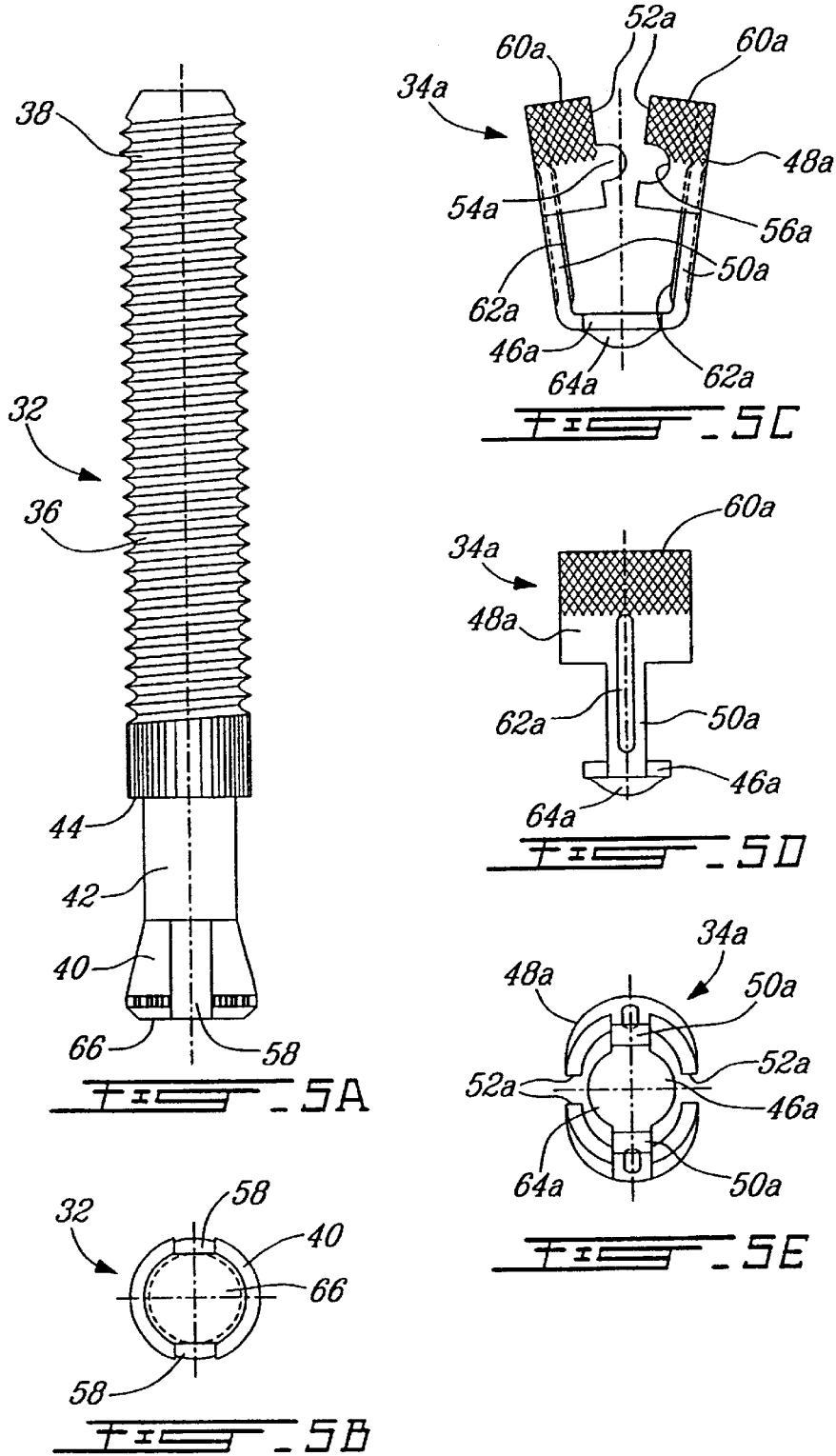

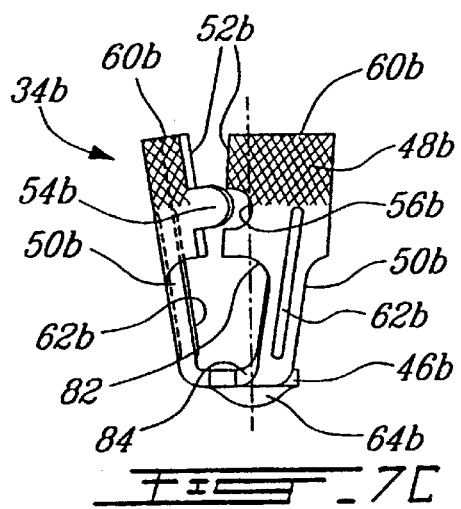
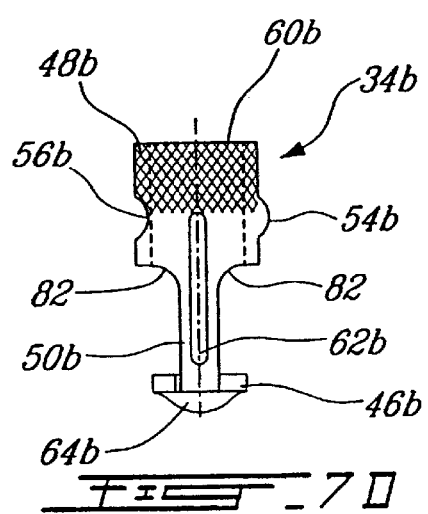
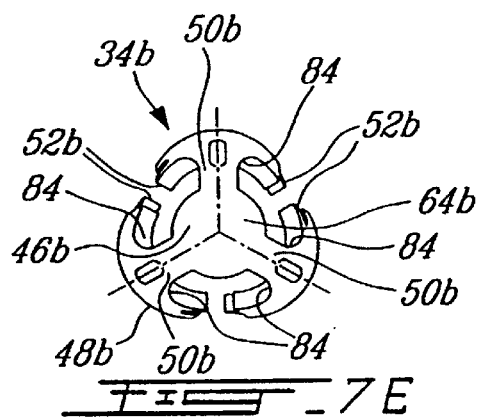
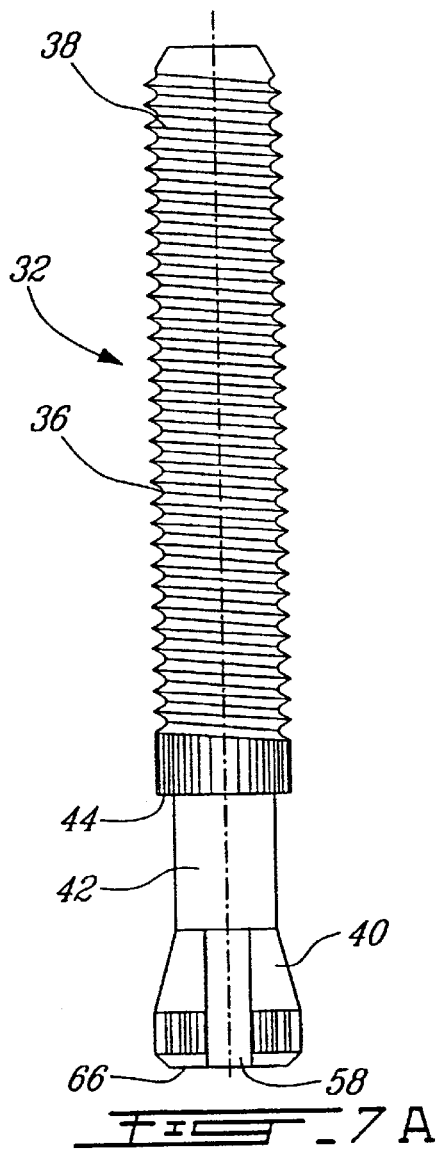
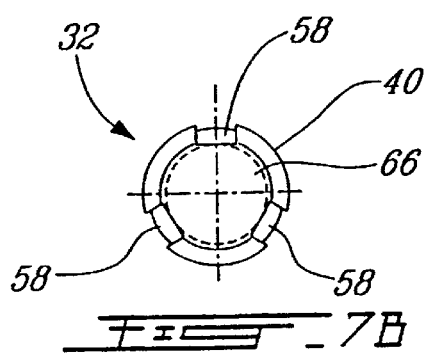

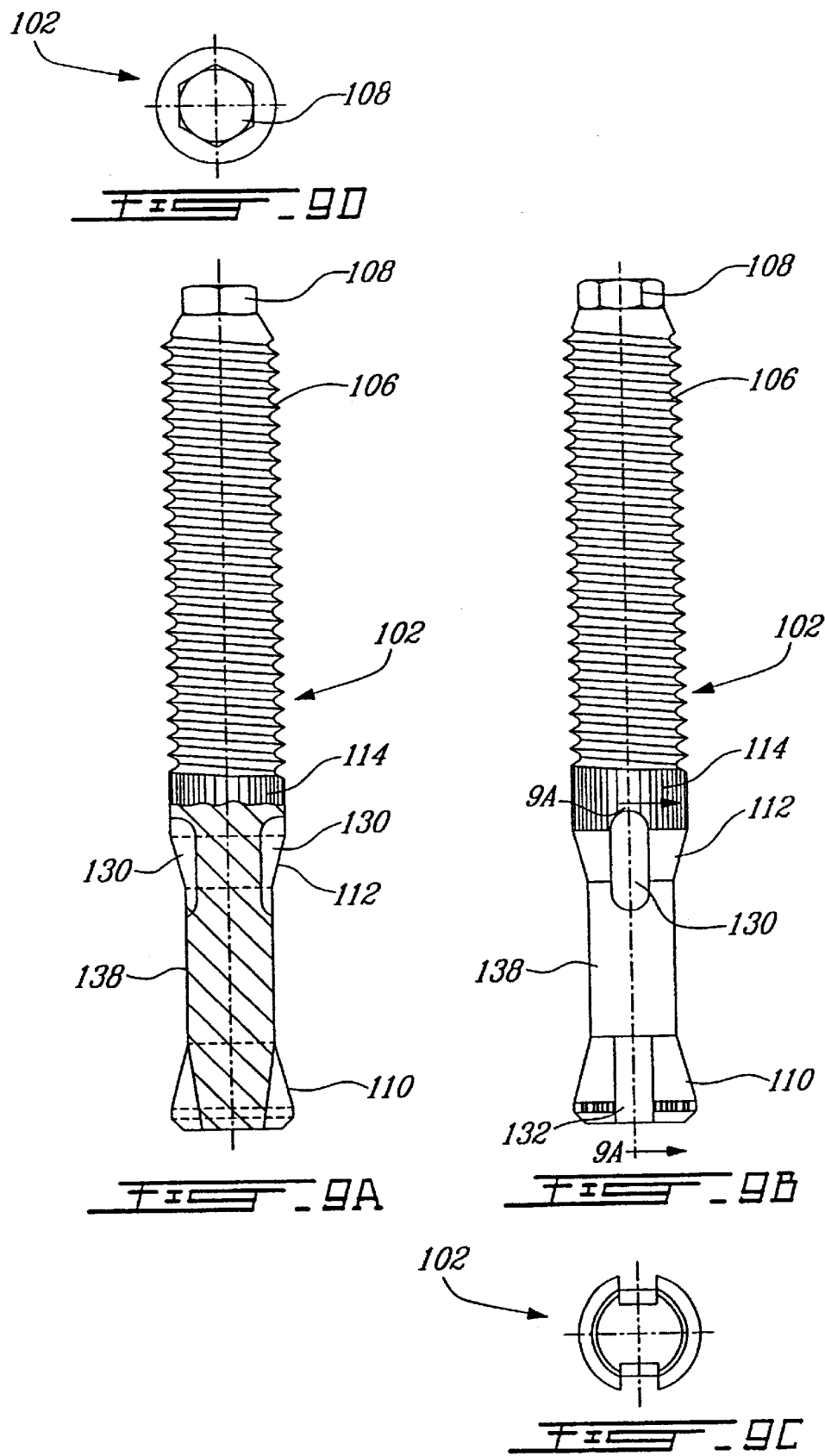

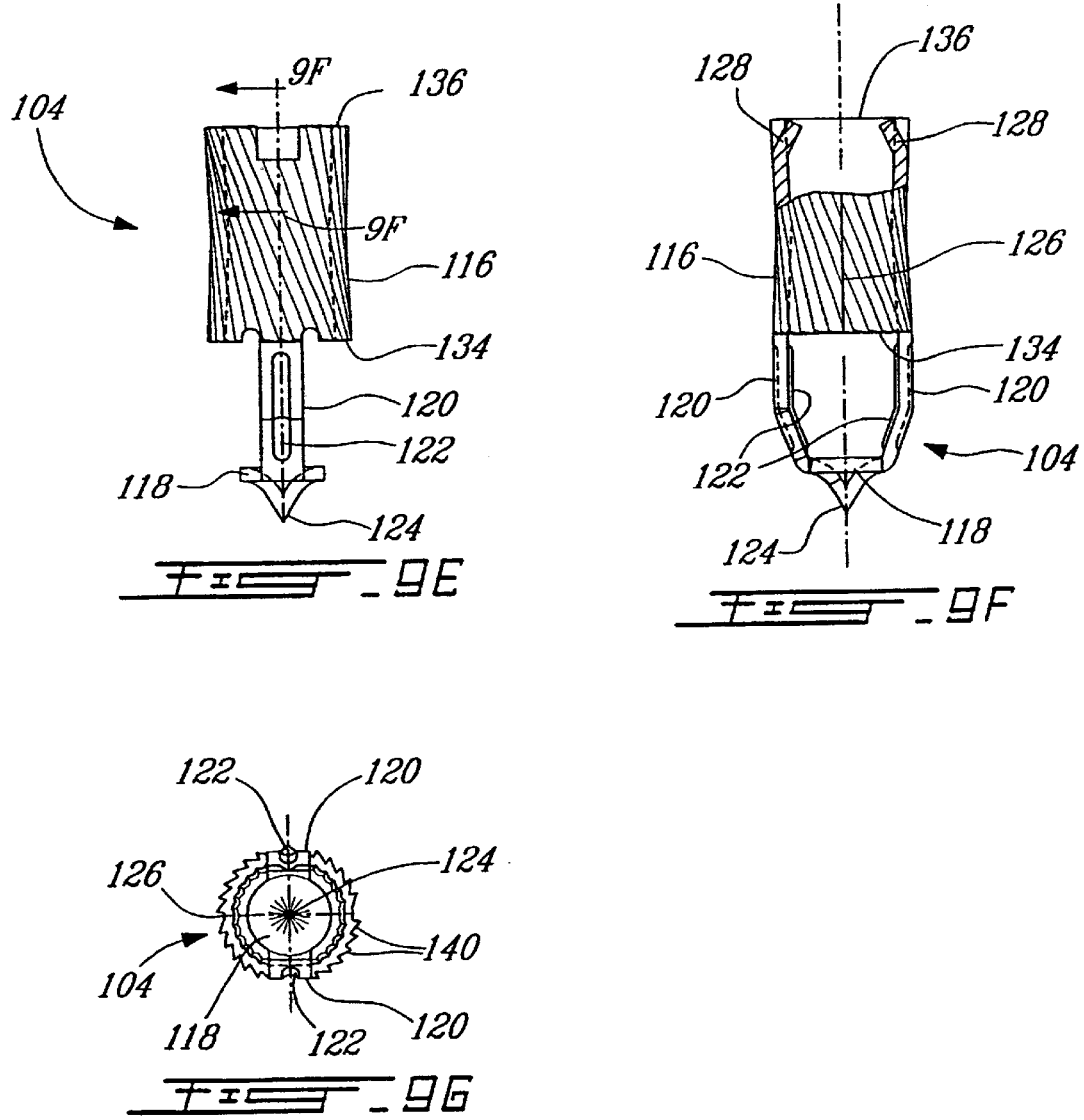

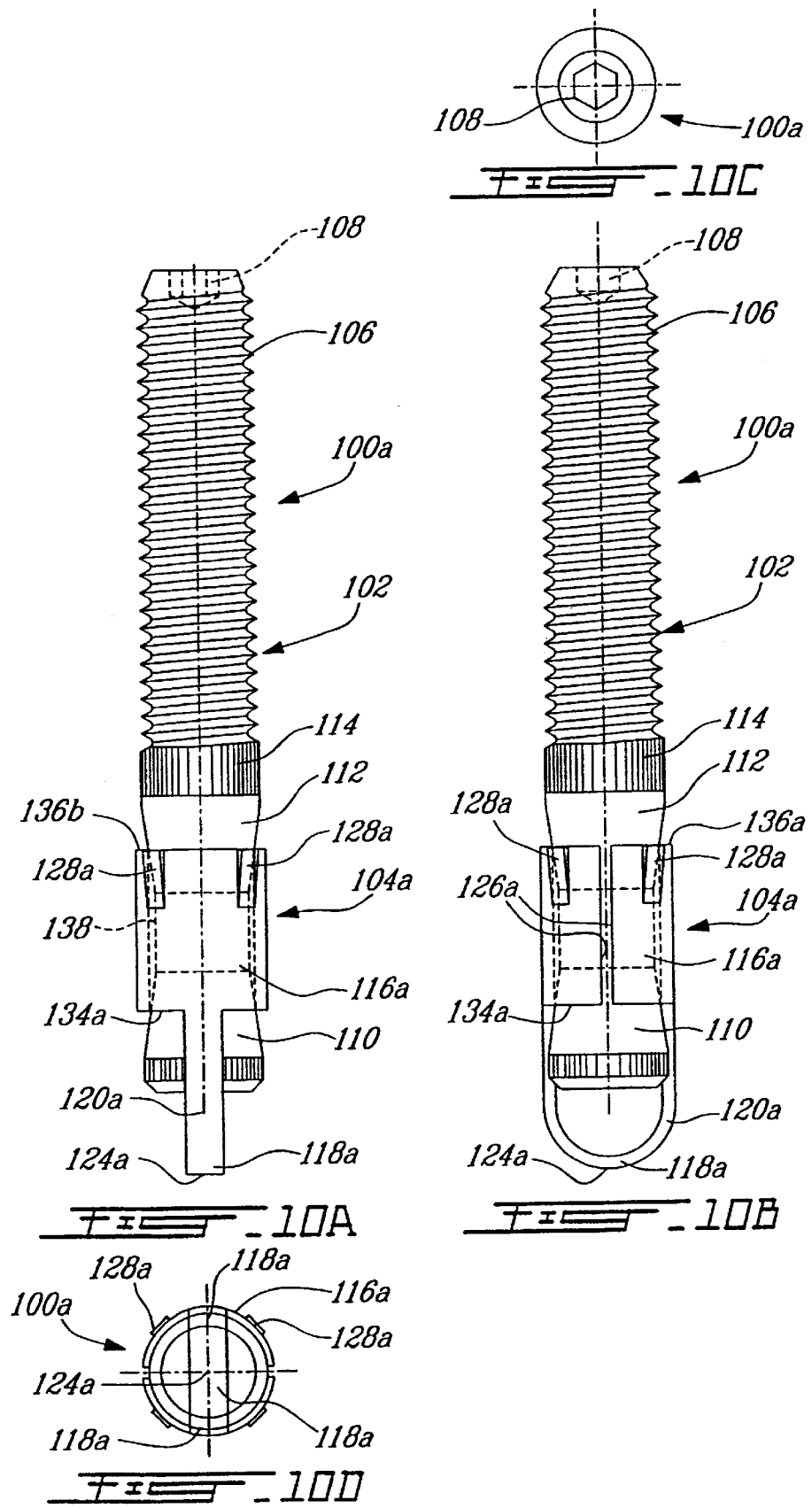

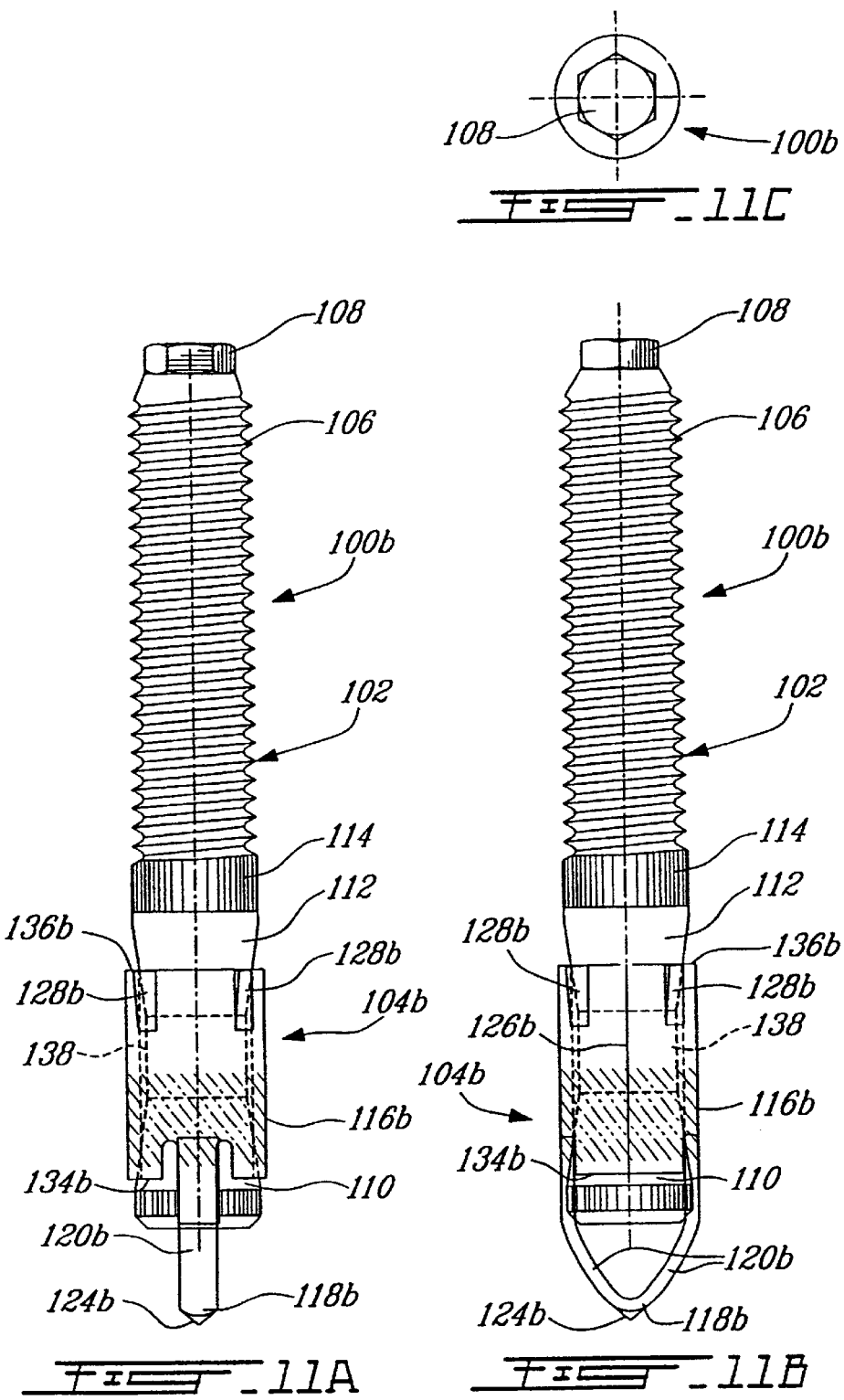

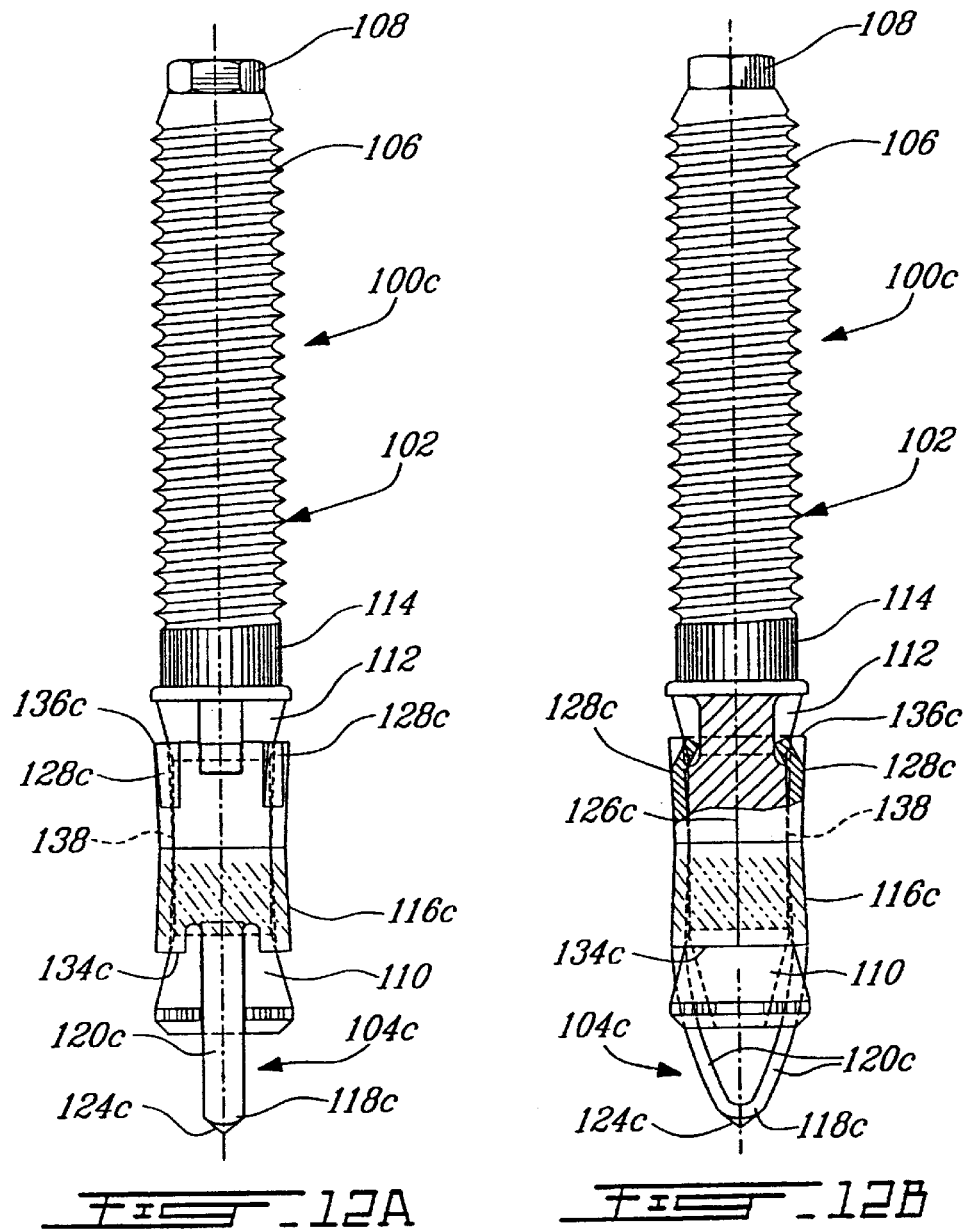

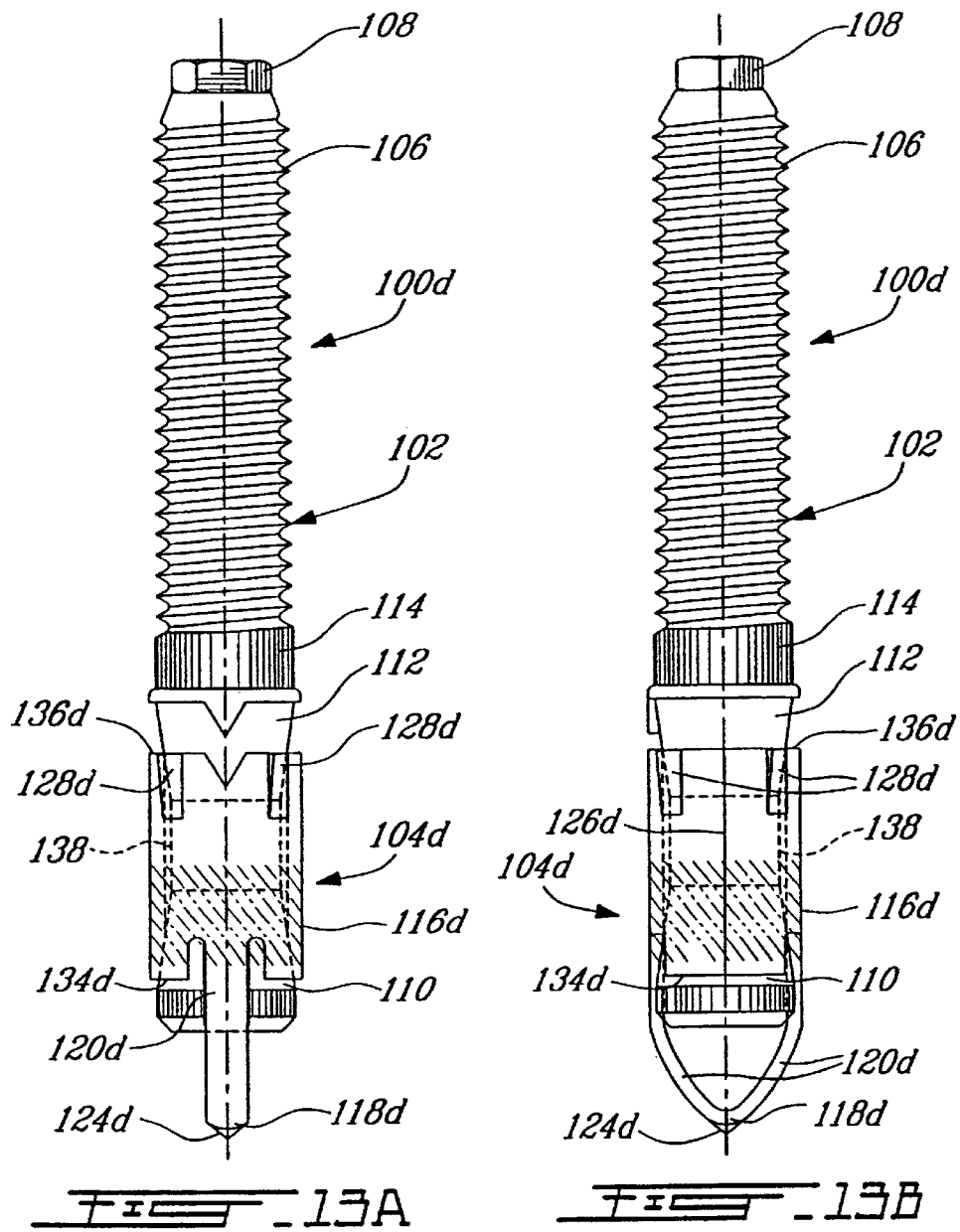
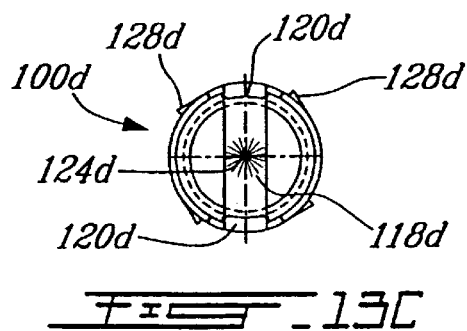

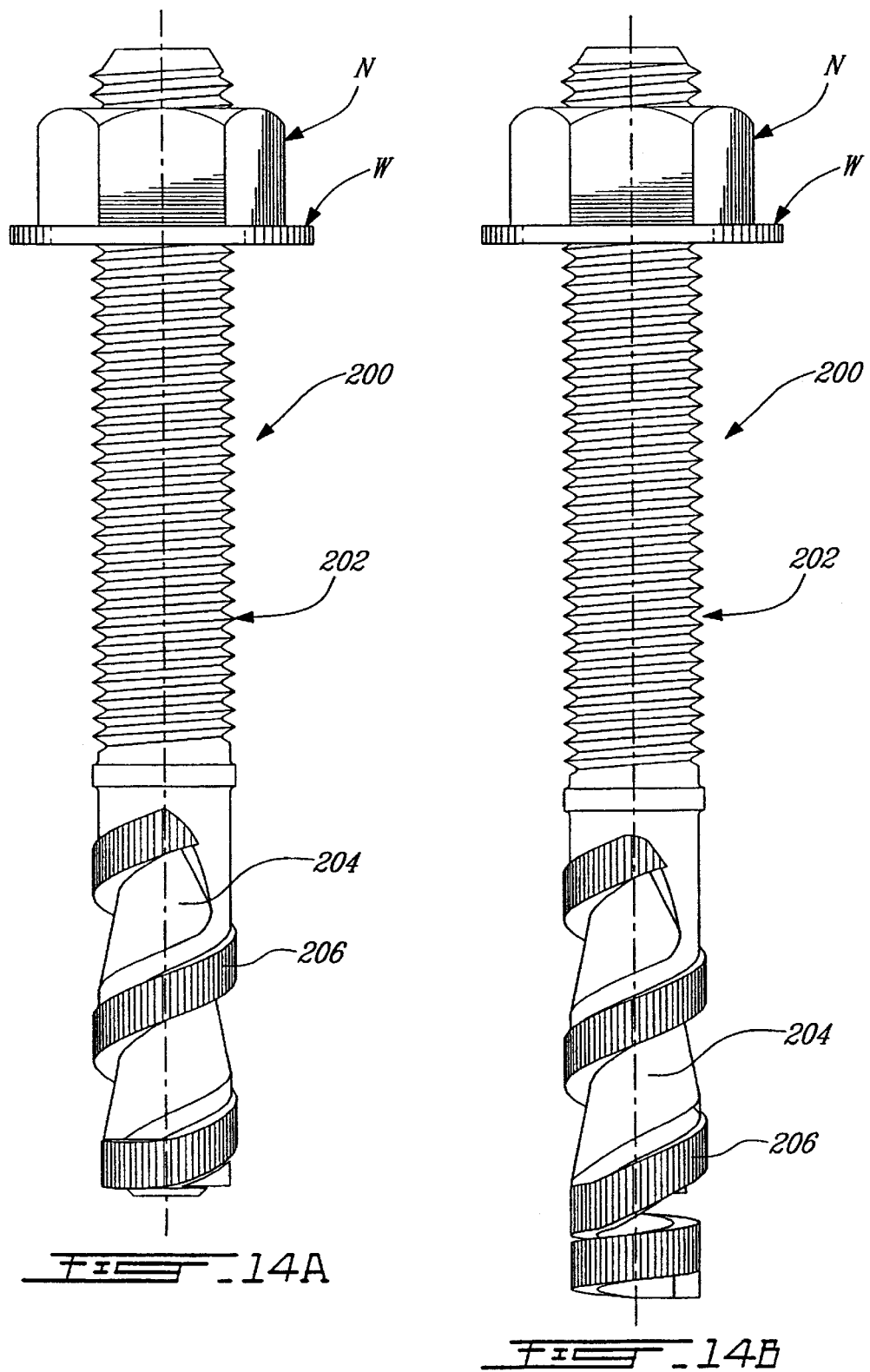

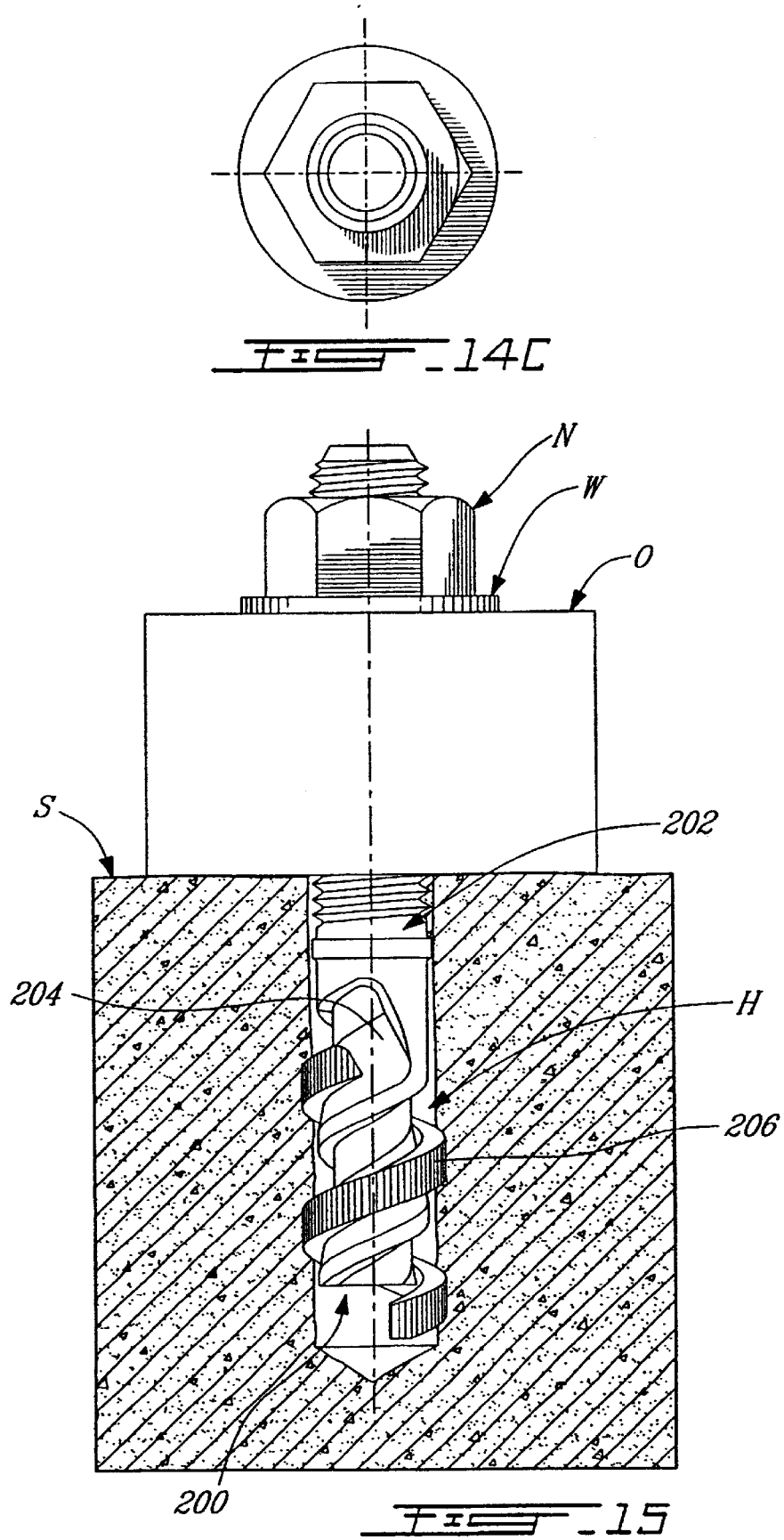

WEDGE ANCHOR FOR CONCRETE

This application claims the benefit of provisional application No. 60/110,530, filed Dec. 12, 1998.

BACKGROUND OF THE INVENTION

1. Field of the Invention

The present invention relates to fasteners and, more particularly, to expandable fasteners for mounting to concrete structures, and the like.

2. Description of the Prior Art

Expandable anchors of many different types are already known. More particularly, expandable anchors have been developed for insertion into a hole formed in a support structure such that a cylindrical expansion sleeve of the anchor may be selectively expanded into frictional contact with the inside peripheral surface of the hole such that the anchor becomes frictionally anchored in the support structure. Typically, the expandable anchor includes an elongated expander member having a threaded first end and a flared second end opposite the first end with a cylindrical surface extending between the first and second ends around which there is provided the aforementioned expansion sleeve. The threaded first end is like a headless screw and extends outwardly of the support structure once the expandable anchor is positioned in the hole thereof. A nut threaded on the visible part of the threaded first end may be used as an actuating mechanism with an object to be secured to the support structure being typically located between the nut and the support structure as the threaded first end of the expandable anchor extends through this object. By rotating the nut, it engages the outer surface of the object and thus bears upon it such as to pull the expander member in an outward direction. As the expansion sleeve is already sufficiently frictionally engaged with the inside surface of the hole, when the expandable anchor is pulled by the rotation of the nut, the expansion sleeve stays substantially stationary in the hole and thus, as the expander member is pulled out of the hole, the flared second end of the expander member causes the cylindrical expansion sleeve to expand radially outwardly thereby increasing a friction between the expansion sleeve and the hole and thus further securing the expandable anchor therein.

Since the expansion sleeve must already be frictionally engaged with the hole before the expandable anchor is pulled, the outside diameter of the expansion sleeve must be similar to, even slightly greater than, the inside diameter of the hole in order to ensure an initial frictional contact therebetween which will then allow the expansion sleeve to remain still in the hole while the expander member is pulled outwardly thereof and thus allow the expansion sleeve to be expanded by the flared end of the expander member. This diameter of the expander member, at rest, results in that the expandable anchor when initially inserted in the hole must be inconveniently driven with significant force therein as the expansion sleeve is already frictionally engaged with the inside wall of the hole. The flared end then acts as a wedge to expand the expansion sleeve into greater frictional contact with the inside of the hole.

For instance, U.S. Pat. No. 2,647,431 issued on Aug. 4, 1953 to Lewis discloses an expansion bolt comprising a hollow shell having a leading end adapted to be expanded by a wedge into frictional contact with the peripheral wall of a hole. Resilient spurs, in some cases as part of a separate bail, are provided at opposite trailing ends of the shell, i.e. the end which is nearest to the opening of the hole, in order to engage the wall of the hole and prevent initial rotation of the shell relative to the hole until the shell frictionally engages the wall.

U.S. Pat. No. 3,250,170 issued on May 10, 1966 to Siegel, U.S. Pat. No. 3,620,120 issued on Nov. 16, 1971 to Warner, U.S. Pat. No. 4,337,012 issued on Jun. 29, 1982 to Sohnius, U.S. Pat. No. 4,403,894 issued on Sep. 13, 1983 to Clark, U.S. Pat. No. 5,028,188 issued to Jul. 2, 1991 to Prince and U.S. Pat. No. 5,344,257 issued on Sep. 6, 1994 to Wright et al. all disclose to expand a shell in a direction normal to a hole axis such that the periphery of the shell frictionally engages a wall of the hole. Notably, U.S. Pat. Nos. 3,620,120, 5,028,188 and 5,344,257 each describes having a resilient shell for facilitating the introduction of the expandable anchor within a hole while providing sufficient holding pressure to prevent the shell and associated wedge member from spinning in the hole as a torque is applied to a bolt for axially displacing the wedge member such as to radially expand the shell.

U.S. Pat. No. 2,783,673 issued on Mar. 5, 1957 to Lewis et al. and U.S. Pat. No. 5,352,066 issued on Oct. 4, 1994 to Schaeffer et al. also both disclose an expandable shell for facilitating the installation thereof within a hole. The leading end of the shell may be expanded at an angle with respect to the central axis of the hole.

Also known are undercut wedge anchors, wherein the hole formed in the support structure is enlarged with a tool at a distance from the visible opening of the hole such that the expandable undercut wedge anchor may thereafter be inserted in the hole until its expansion sleeve becomes located behind a shoulder defined at the junction of the enlarged area and the remainder of the hole. Once expanded, the expansion sleeve may abut this shoulder and thus retain the anchor in position in the support structure.

SUMMARY OF THE INVENTION

It is therefore an aim of the present invention to provide an improved expandable wedge anchor for use in holes in various materials, e.g. concrete.

It is also an aim of the present invention to provide an expandable wedge anchor having an expander member and an expansion member capable of spring-like deformation.

It is a further aim of the present invention to provide an expandable wedge anchor wherein the expansion member is capable of being expanded at a trailing end thereof.

It is a still further aim of the present invention to provide an expandable wedge anchor wherein the expansion member may be rotated in the hole such that its trailing end produces an undercut in the hole into which the expanded trailing end nests.

It is a still further aim of the present invention to provide a spiral wedge anchor also in accordance with the present invention.

Therefore, in accordance with the present invention, there is provided an expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole when said expander means is positioned in the hole, wherein upon longitudinal withdrawal of said expander means from the hole, said expander means displaces longitudinally relative to said expansion means with said flaring means thereof gradually causing said trailing end of said expansion means to expand, whereby a trailing edge of said expansion means engages the wall of the hole.

More particularly, said trailing end is adapted, when expanded by said flaring means, to extend at an angle with respect to a longitudinal axis of said expander means.

Also in accordance with the present invention, there is provided a method of setting an expansion wedge anchor in a hole delimited by a wall, comprising the steps of: (a) providing an expander member and an expansion member; and (b) displacing said expander member such as to cause a trailing end of said expansion member to engage the wall of the hole.

More particularly, in step (b), said trailing end is expanded such as to extend at an angle with respect to a longitudinal axis of said expander member.

BRIEF DESCRIPTION OF THE DRAWINGS

Having thus generally described the nature of the invention, reference will now be made to the accompanying drawings, showing by way of illustration a preferred embodiment thereof, and in which:

FIGS. 1A and 1B are longitudinal cross-sectional views of a first variant of a non-slip wedge anchor in accordance with the present invention shown respectively in at rest and installed positions thereof;

FIG. 1C is a bottom plan view of the anchor of FIG. 1A;

FIGS. 2A and 2B are longitudinal cross-sectional views of a second variant of a non-slip wedge anchor in accordance with the present invention shown respectively in at rest and assembled positions thereof;

FIGS. 4A and 4B are longitudinal cross-sectional views of a third variant of a non-slip wedge anchor in accordance with the present invention shown respectively in at rest and assembled positions thereof;

FIGS. 5A and 5B are respectively elevational and bottom plan views of an expander member of the anchor of FIGS. 4A and 4B;

FIGS. 5C, 5D and 5E are respectively front elevational, side elevational and bottom plan views of an expansion member of the anchor of FIGS. 4A and 4B;

FIGS. 7A and 7B are respectively elevational and bottom plan views of an expander member of the anchor of FIGS. 6A and 6B;

FIGS. 7C, 7D and 7E are respectively front elevational, side elevational and bottom plan views of an expansion member of the anchor of FIGS. 6A and 6B;

FIGS. 9A to 9D are respectively front elevational, side elevational, bottom plan and top plan views of an expander member of the undercut wedge anchor of FIGS. 8A and 8B;

FIGS. 9E to 9G are respectively front elevational, side elevational and bottom plan views of an expansion member of the undercut wedge anchor FIGS. 8A and 8B;

FIGS. 10A to 10D are respectively front elevational, side elevational, bottom plan and top plan views of a second variant of an undercut wedge anchor in accordance with the present invention;

FIGS. 11A to 11C are respectively front elevational, side elevational and top plan views of a third variant of an undercut wedge anchor in accordance with the present invention;

FIGS. 12A to 12C are respectively front elevational, side elevational and bottom plan views of a fourth variant of an undercut wedge anchor in accordance with present invention;

FIGS. 13A to 13C are respectively front elevational, side elevational and bottom plan views of a fifth variant of an undercut wedge anchor in accordance with present invention;

FIG. 14A is a front elevational view of a spiral wedge anchor also in accordance with the present invention;

FIG. 14B is a variant of the spiral wedge anchor of FIG. 14A;

FIG. 14C is a top plan view of either anchor of FIGS. 14A and 14B; and

FIG. 15 is a vertical cross sectional view showing the spiral anchor wedge of FIG. 14A in an expanded position within a hole defined in a support structure such that the anchor retains an object to this support structure.

DESCRIPTION OF THE PREFERRED EMBODIMENTS

Figure 3A:
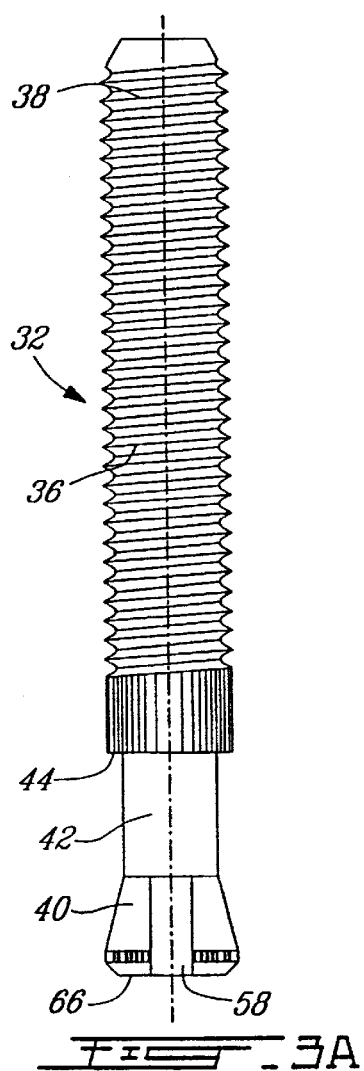
FIGS. 3A and 3B are respectively elevational and bottom plan views of an expander member of the anchor of FIGS. 2A and 2B.
Figure 3B:
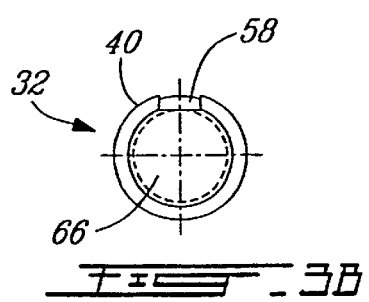
Figure 3C:
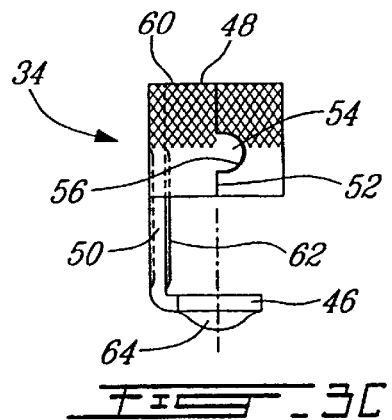
FIGS. 3C, 3D and 3E are respectively front elevational, side elevational and bottom plan views of an expansion member of the anchor of FIGS. 2A and 2B.
Figure 3D:
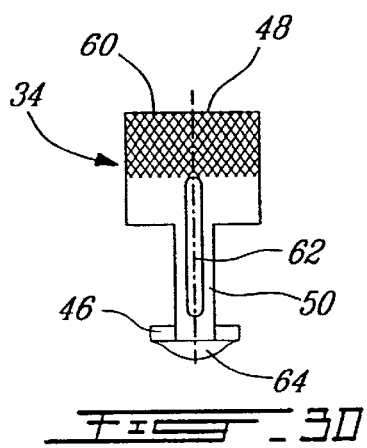
Figure 3E:
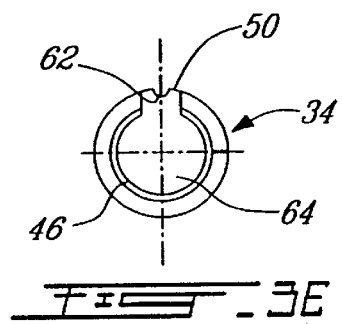
Figures 6A, 6B:
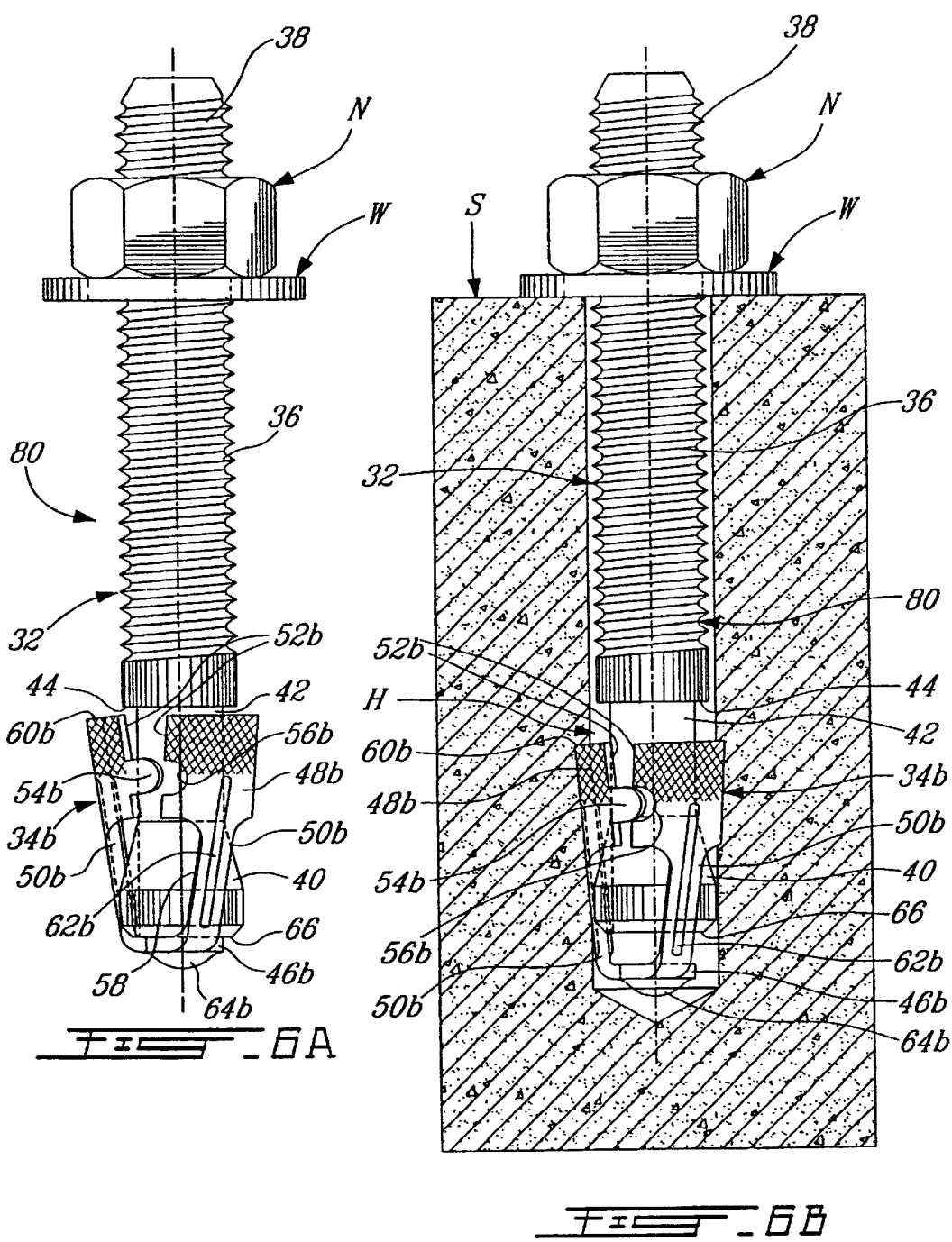
FIGS. 6A and 6B are longitudinal cross-sectional views of a fourth variant of a non-slip wedge anchor in accordance with the present invention shown respectively in at rest and assembled positions thereof.

A) Non-Slip Wedge Anchors (FIGS. 1 to 7)

The purpose of this new non-slip expansion anchor concept is to provide an improved anchor design capable of achieving superior performance over conventional type expansion anchors presently offered. Another area to be considered is that of the effect of vibratory loading on the anchor performance. This is relevant considering the anchor is designed to provide minimal relaxation of the anchor assembly after installation. In conventional expansion anchors the bolt tends to loosen after the initial setting torque has been applied and as a result it must be re-tightened to establish the proper clamping load. The positive set between the anchor bolt and clip segments will provide minimal slip or creep once the anchor is set and the load is applied to the anchor.

FIGS. 1A and 1B illustrate a non-slip wedge anchor 10 in accordance with the present invention which is shown respectively in at rest and installed positions thereof. In FIG. 1C, the anchor 10 is seen from its underside. The anchor 10 includes an expander member 12 and an expansion member 14. The expander member 12 is designed to be inserted in a hole H defined in a support structure S, such as a concrete element, and comprises a treaded section 16 adapted to extend in the hole H while having a proximal end 18 which extends outside of the hole H such as to be engaged by a threaded female member, such as a nut N, with a washer W being herein shown between the nut N and the support structure S. Typically, an object, although not herein shown, is held by the anchor 10 to the support structure S; it is noted that, in the present embodiment, as well as in the other embodiments of the various anchors herein shown and described, such an object has not been illustrated.

The expander member 12 also includes a flared distal end 20 around which is provided the expansion member 14 which is dimensioned to frictionally engage the walls of the hole. Once the anchor 10 has been introduced in the hole H, the nut N is rotated to displace the expander member 12 translationally outwardly of the hole H, As the friction forces between the expansion member 14 and the hole H are sufficient for it to remain stationary therein during the displacement of the expander member 12, the flared end 20 of the expander member 12 causes the expansion member to expand, as seen in FIG. 1B, thereby anchoring the anchor 10 in the hole H. The expansion member includes a double-layered, folded over, proximal or trailing end 22 which defines an internal abutment shoulder 24 which can be engaged by an enlarged annular flange 26 provided distally of the flared end 20 of the expander member 12.

In FIGS. 2A and 2B, a second wedge anchor 30 in accordance with present invention is illustrated and which comprises an expander member 32 (shown in detail in FIGS. 3A and 3B) and an expansion member 34 (shown in detail in FIGS. 3C to 3E), or expandable clip. The expander member 32 is similar to the expander member of FIG. 1A in that it includes a treaded section 36, having a proximal end 38, a leading flared end 40 and a reduced diameter intermediate cylindrical section 42 therebetween. A shoulder 44 is defined at a junction of the intermediate and threaded sections 42 and 36.

The expansion member 34 comprises a leading support 46, an expandable collar 48 and a leg 50 connecting the support 46 and collar 48 together. The collar 48 is split at 52 to allow it to expand, as seen in FIG. 2B, and defines thereat mating tongue and groove elements 54 and 56, respectively. As seen in FIGS. 2A and 2B, the leg 50 of the expansion member 34 is held captive in a groove 58 defined longitudinally in the flared end 40 (see FIGS. 3A and 3B) thereby preventing the expansion member 34 from rotating with respect to the expander member 32 and forcing it to work vertically without twisting.

In operation, the rotation of the nut N causes the expander member 32 to displace longitudinally and outwardly along the hole H. As the collar 48 of the expansion member 34 frictionally engages the walls of the hole H, it remains stationary therein while the groove 58 slides along the leg 50. It is noted that the leg 50 is biased outwardly, i.e. to an open or deployed position, to ensure the initial frictional engagement of the collar 48 with the walls of the hole H. It is also noted that the outside surface of the collar 48 is knurled for additional friction.

The partial withdrawal of the expander member 32 from the hole H causes the flared end 40 to expand outwardly the collar 48 with a trailing edge 60 of the collar 48 engaging the walls of the hole H at an angle with respect to a longitudinal axis of the hole H (see FIG. 2B). Such an engagement with the hole H at a trailing end of the expandable member 34, and with an angle opposed to that of the flared end 40, is very secure and increases the force required to pull out the expanded anchor 30 from the support structure S.

It is noted that the cylindrical intermediate section 42 allows the collar 48 to be received in a collapsed position (see FIG. 2A) when the anchor 30 is initially driven in the hole H. Also, the shoulder 44 prevents the expandable member 34 from moving up on the threaded section 36 of the expander member 32. The tongue and groove elements 54 and 56 align the collar 48 at its split 52 to provide a peripheral, 360°-like, gripping of the expandable member 34 into the walls of the hole H.

The expandable member 34 is also provided on its leg 50 with a reinforcement rib 62 to provide more rigidity to the leg 50. The leading support 46 of the expandable member 34 comprises a concave bottom 64 to still give more rigidity to the leg 50. At the very end of the flared section 40 of the expander member 32 is a radial flat section land 66 to allow for maximum interference between the hole H, the expander member 32 and the expansion member 34.

In the following descriptions which pertain to variants of the anchor 30 of FIGS. 2A and 2B, components which are identical in function and in structure to corresponding components of the anchor 30 bear the same references as in FIGS. 2A to 3E, whereas similar parts have been attributed suffixes to their reference numerals with respect to the numerals used in FIGS. 2A to 3E. Any components which are new to the anchors of the following variants are identified by new reference numerals.

In FIGS. 4A to 5E and 6A to 7E, third and fourth wedge anchors 70 and 80, respectively, also in accordance with present invention are illustrated. These anchors 70 and 80 are very similar to the anchor 30, except that their respective expansion members 34a and 34b have respectively 2 and 3 legs 50a and 50b, respectively, as opposed to the single leg 50 embodied in the expansion member 34 of anchor 30. The multiple splits 52b result in that the collar 48b includes three clip segments.

The expansion member 34b of anchor 80 defines a pair of rounded radii 82 and 84 to increase the rigidity of the legs 50b.

Therefore, with respect to the anchor of FIGS. 6A to 7E, the new wedge concept is made up of two components. One is a specially formed stud or expander member which is partially threaded at one end. Assembled to the bottom end is a multi segment expansion clip or expansion member which is assembled to the flared end of the stud opposite the threaded end.

The stud (FIGS. 7A and 7B) is made of high strength steel which can be heat treated for heavy duty applications. The stud is unique in that it contains a number of features unlike conventional wedge type anchors. The stud is comprised of an external thread at one end which has a reduced diameter at the bottom end of the thread which engages the multi segmented clip. The difference in diameter prevents the clip from travelling upward onto the threads of the bolt. The end of the bolt opposite to the thread end has a flared section extending outward. The end of the flare incorporates several guide segments used to maintain the position of the expansion member as it expands during installation and is also used to prevent rotation of the total clip itself. At the very end of the flared section of the bolt is a radial flat section land to allow for maximum interference between the hole, stud and expansion clip.

The expansion clip (FIGS. 7C to 7E) is made of high strength steel and is comprised of three formed segments which are pre-expanded prior to assembly. Each of the segments compresses against the hole in the concrete when driven into the hole providing frictional resistance to axial pullout during installation and after the load is applied.

Each segment is connected to a formed concave shaped section via a formed leg section. Each leg connecting a segment has a strengthening rib and internal radii to add rigidity to the clip assembly. Another feature located on each segment is a locking tab which helps control expansion and keep the clip segments in line. This provides for a full 360 degree expansion. A portion of each is knurled to provide additional friction and holding power.

Anchor Installation/Function

A nut/washer is assembled to the threaded end of the stud assembly. The embedment is determined and measured from directly under the washer to the bottom end of the bolt. The anchor is driven into a pre-drilled hole in the concrete. As the anchor is driven into the hole using a hammer, the pre-expanded segments of the clip assembly provide the frictional resistance to resist the axial pullout resulting during the initial setting of the anchor.

As the installation torque is increased, the nut is tightened flush against the flat washer and the concrete. As a result the tapered portion at the bottom of the stud is pulled upward into the clip segments causing expansion of the lower clip segments located toward the bottom portion of the bolt (see FIG. 6B). The constant outward force provided by the upper section of the segments cause the clip segments to dig into or interfere with the concrete thus preventing the clip assembly from sliding or creeping upward which causes the bolt to loosen in the hole of the concrete. Once the installation torque is reached, the load can be applied to the bolt.

B) Undercut Wedge Anchor (FIGS. 8 to 13)

The purpose of this undercut type anchor concept is to provide a high strength instant holding mechanical type anchor designed to achieve superior pullout performance in concrete while provided a positive lock into the concrete to prevent anchor slip or creep.

The feature of being instant holding makes it suitable for applications needing to apply the load immediately which is not the case with chemical type anchors. This anchor must be capable of withstanding both vibratory and shock type loads without failure. Failure would be determined by the improved load versus displacement relationship.

Figures 8A, 8B:
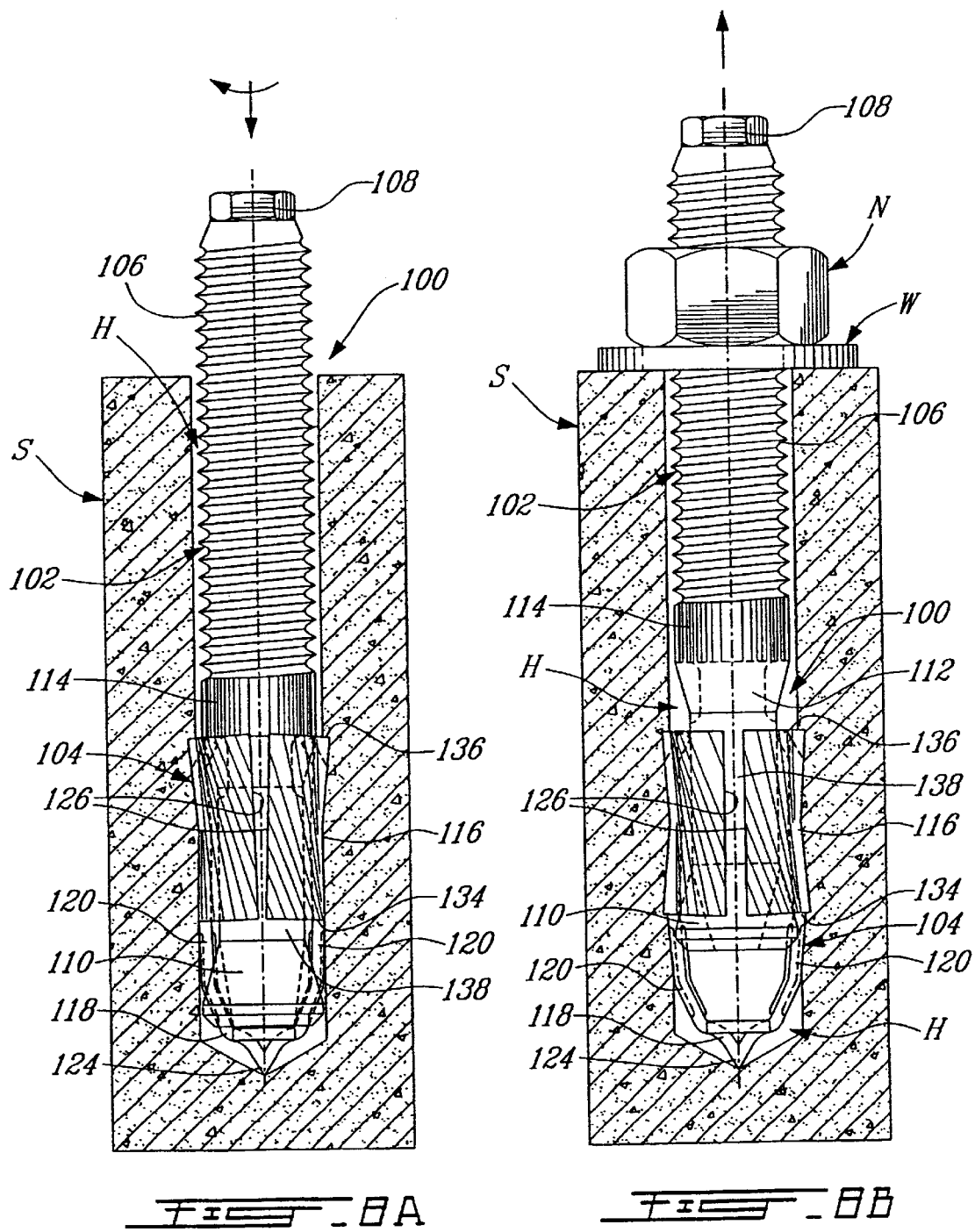
FIGS. 8A and 8B are longitudinal cross-sectional views of a first variant of an undercut wedge anchor in accordance with the present invention shown respectively in first and second positions thereof in a support structure.

FIGS. 8A and 8B illustrate an undercut wedge anchor 100 in accordance with the present invention which is shown respectively in first and second positions thereof in a support.

The undercut anchor 100 consists of two specially formed components, namely a stud or expander member 102 and a clip or expansion member 104, both made of high strength steel to provide the resistance needed to overcome the forces acting as a result of the high installation torque required to set the anchor into the concrete. Existing designs consist of more than two assembled components.

The expander member 102 which is made of high strength steel to resist heavy duty tension and shear applications comprises a threaded section 106, a proximal hex drive element 108 located at the top or beginning of the threaded section as a positive means of providing the spinning or rotational action to the anchor 100 during installation. The standard hex element 108 allows the use of a conventional type socket type drive for fast access and easy removal.

At the opposite end of the expander member 102 is a specially designed stud configuration that provides a means to expand the undercut mechanism (or expansion member 104) which will provide the positive lock between the expander member 102 and the concrete of the support structure S. This stud configuration consists of longitudinal opposed first leading and second trailing flared portions 110 and 112, respectively. The trailing tapered portion 112, located towards the threaded section 106, provides a means of expanding the undercut mechanism or expansion member 104 which in turn defines the undercut into the concrete. At a proximal end of the trailing flared portion 112, is a collar 114 which is used to prevent the undercut mechanism or expansion member 104 from moving onto the threaded section 106 of the expander member 102.

The leading flared portion 110 provides a means of expanding the bottom portion, or distal end, of the expansion member 104, to thus complete the undercut/locking process. At the end of each flared portion is a specially formed configuration to prevent the expansion member 104 from rotating free of the expander member 102 during the initial undercut action and during the final installation process.

The multiple function specially designed undercut mechanism/expansion member 104 which is made of high strength steel comprises an expandable collar 116, a leading support 118 and a pair of legs 120, reinforced with ribs 122, connecting the expandable collar 116 and the leading support 118 together. The leading support 118 has a formed end 124 at the bottom to reduce friction and serve as a means of providing a way of forcing the expandable collar 116 against the trailing flared portion 112 of the expander member 102.

The expandable collar 116 is split at 126 to allow it to expand and has at its trailing end a pair of inwardly directed tabs 128 which with the legs 120 engage trailing and leading recesses 130 and 132, respectively, defined in the trailing and leading flared portions 112 and 110. The expansion member 104 is held captive by these longitudinal recesses 130 and 132 thereby preventing the expansion member 104 from rotating with respect to the expander member 102 and forcing it to work vertically without twisting. The expandable collar 116 defines opposed leading and trailing edges 134 and 136, respectively. Between the flared portions 110 and 112, the expander member 102 defines a cylindrical portion 138 which allows the expandable collar 116 to be received in a collapsed position when the anchor 100 is initially driven in the hole H.

Anchor Installation/Function

The anchor 100 is driven into the pre-drilled hole H until it is reaches its bottom (see FIG. 8A). A rotary drill with a hex drive socket attached is assembled to the external hex drive element 108. To facilitate the undercut action, the installer forces the expander member 102 down by applying constant downward pressure thereon while it is spinning. Once the expansion member 104 is frictionally engaged to the walls of the hole H, the further downward displacement of the expander member 102 causes the trailing flared section 112 to engage the expansion member 104 and forces the latter to expand radially outward (see FIG. 8A), such that the rotation of the expander member 102 resulting from it being connected to the rotary drill causes the expansion member 104 to rotate (as it connected at its tabs 128 and legs 120 to the trailing and leading recesses 130 and 132 of the expander member 102). The spinning of the expansion member 104 causes its trailing edge 136 to cut into the support structure S (e.g. of concrete), thus providing the initial undercut action.

Once the undercut action has been completed, the expander member 102 is set by assembling the nut N and washer W to a trailing end of its threaded section 106. The nut N is rotated until it is hand tight against the flat washer W and flush with the support structure S. As the nut N is tightened to a specified torque, it draws the expander member 32 longitudinally and outwardly out of the hole H. Although the trailing flared portion 112 disengages from the collar 116, the trailing edge 136 of the collar 116 remains set in the undercut (see FIG. 8B) in view of its memory, for instance resulting from the trailing edge 136 having been plastically deformed. As the expandable collar 116 remains stationary by virtue of the positive locking engagement of its trailing edge 136 with the walls of the hole H, the leading flared portion 110 causes the leading end of the collar 116 to expand outwardly (see FIG. 8B). The expansion member 104 is prevented from rotating by its legs 120 being laterally confined in the recesses 132 and being thus limited to relative longitudinal displacement therein. It is noted that the expandable collar 116 may be spring loaded or biased outwardly, i.e. to a partly open or deployed position, to ensure the initial frictional engagement thereof with the walls of the hole H.

The partial withdrawal of the expander member 102 from the hole H thus causes the leading flared portion 110 to expand the collar 116 outwardly with the leading edge 134 of the collar 116 engaging the walls of the hole H (see FIG. 8B) thereby completing the setting of the undercut mechanism/expansion member 104.

The anchor 100 thus provides the undercut needed to maintain the locked position of the installed anchor 100. The upper portion of the expansion member 104 also contains a special configuration which includes a formed cutting edge 136 and/or surface to allow it to cut into the concrete and aggregate via the axial rotation provided by the drive tool spinning the expander member 102. To increase resistance to wear, a special coating (e.g. abrasive, diamond coatings) or a series of hardened particles 140 can be applied onto the surface and/or cutting edge 136 of the undercut portion of the expansion member 104.

The hex drive element 108 can take other forms as long as the expander member 102 can be gripped from outside the hole H and rotated.

FIGS. 10A to 10D, 11A to 11C, 12A to 12C and 13A to 13C show four variants of the undercut wedge anchor 100 wherein the expansion member 104 of FIGS. 9E to 9G has been modified, for instance at its formed end 114 and tabs 128 (with similar adjustments to the trailing recesses 130).

In the present non-slip wedge anchors (see FIGS. 1 to 7) and undercut wedge anchors (see FIGS. 8 to 13), the expansion of the expansion member (see, for instance, FIG. 7C of the non-slip wedge anchor and FIGS. 8B and 9E of the undercut wedge anchor) results from that at least proximal or trailing edge thereof, i.e. and upper section of the expandable segments thereof, bites into or interferes with the peripheral concrete wall of a receiving hole thereby preventing the assembly from sliding or creeping upwards and cause the bolt to loosen in the hole defined in the concrete structure. This prevents axial removal of the anchor from the hole. By so expanding the expansion member, resistance to axial pullout is improved. The resiliency of the expansion member allows the anchor to be easily inserted in the hole while urging the same against the wall of the hole to prevent the expansion member from rotating as a torque is applied to a nut engaged to the bolt. The rotation of the nut causes the bolt to move translationally outwardly of the hole and thus causes a flared expander portion of the bolt to move axially into the stationary expansion member to expand the expansion member as per the way described hereinbefore. With respect to the non-slip wedge anchor, this is well illustrated in FIG. 6B, and in the case of the undercut wedge anchor, this is well shown in FIG. 8B.

In the case of the undercut wedge, there is a first expansion of the expansion member followed by a rotation of the bolt such that the expanded upper edge of the expansion member cuts into 360° of concrete and thus provides the undercut needed to maintain the locked position of the anchor. More specifically, the first expansion of the expansion member is effected by applying a constant downward pressure on the bolt so as to cause the expansion to move axially over an upper flared portion of the bolt. Once the undercut action has been completed, the expansion member is expanded by drawing a lower flared portion of the bolt into the expansion member via operation of a nut threadably engaged with the threaded end of the bolt, thereby completing the setting of the undercut/expansion mechanism.

A main advantage of the above-described non-slip and undercut wedge anchors resides in the fact that they provide a much stronger grip than that of known friction-based sleeve designs. In the case of the undercut wedge anchor, no separate drill bit is required to define the undercut.

C) Spiral Wedge Anchor (FIGS. 14 to 15)

FIG. 14A illustrates a spiral wedge anchor 200 having a stud or expander member 202 defining a spiral and tapered lower end 204 for receiving a resilient coil or expansion member 206 (e.g. made of hard steel) which, in view of the initial frictional engagement of the coil 206 with the wall of the hole H in the support structure S, climbs along the tapers of the lower stud end 204 as the stud 202 is pulled rotatably outwardly of the hole H, whereby the coil 206 is expanded outwardly radially for further contacting the hole H (as seen in FIG. 15), being firmly wedged between the concrete S and the stud 202. An object O can thus be firmly held to the support structure S.

When referring throughout this disclosure and claims to terms such as "withdraw", it is readily understood that the expander member is not completely removed from the hole, but rather partly displaced longitudinally out of the hole and relative to the expansion member for effecting the expansion of the expansion member. The anchored position of the present anchors well illustrate this configuration (see FIGS. 11B, 2B, 4B, 6B, 8B and 15).

What is claimed is:

1. An expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole when said expander means is positioned in the hole, wherein upon longitudinal withdrawal of said expander means from the hole, said expander means displaces longitudinally relative to said expansion means with said flaring means thereof gradually causing said trailing end of said expansion means to expand, whereby a trailing edge of said expansion means engages the wall of the hole, said trailing end being adapted, when expanded by said flaring means, to extend at an angle with respect to a longitudinal axis of said expander means and to so engage the wall of the hole.

2. An expansion wedge anchor as defined in claim 1, wherein said expander means comprise proximally of said flaring means a threaded section adapted to be engaged, at a proximal end thereof outside the hole, by a female threaded member which when rotated causes said expander means to displace translationally along the hole.

3. An expansion wedge anchor as defined in claim 1, wherein said expander means and said expansion means are each made of a single unitary component.

4. An expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole when said expander means is positioned in the hole, wherein upon longitudinal withdrawal of said expander means from the hole, said expander means displaces longitudinally relative to sale expansion means with said flaring means thereof gradually causing said trailing end of said expansion means to expand, whereby a trailing edge of said expansion means engages the wall of the hole, said flaring means comprising a flared end which tapers towards a threaded section provided on said expander means proximally of said flaring means, an intermediate section being provided proximally of said flared end and having a diameter less than that of said threaded section, said intermediate section providing space to accommodate outwardly thereof at least part said expansion means in a collapsed position thereof at least for during insertion of said anchor in the hole.

5. An expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole when said expander means is positioned in the hole, wherein upon longitudinal withdrawal of said expander means from the hole, said expander means displaces longitudinally relative to said expansion means with said flaring means thereof gradually causing said trailing end of said expansion means to expand, whereby a trailing edge of said expansion means engages the wall of the hole, said expansion means comprising a threaded section proximally of said flaring means, said expander means defining a shoulder between said threaded section and said intermediate section for preventing said expansion means from reaching threaded section.

6. An expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole when said expander means is positioned in the hole, wherein upon longitudinal withdrawal of said expander means from the hole, said expander means displaces longitudinally relative to said expansion means with said flaring means thereof gradually causing said trailing end of said expansion means to expand, whereby a trailing edge of said expansion means engages the wall of the hole, wherein said expansion means comprises a leading support located distally past said leading end, an expandable collar means provided proximally of said leading support and at least one leg means extending outwardly of said expander means and connecting said collar means to said leading support, said collar means defining said trailing edge and being adapted to be outwardly expanded by said flaring means wherein said collar means is angled relative to a longitudinal axis of the hole, said collar means flaring from a distal end thereof toward a proximal end thereof, said proximal end defining said trailing edge, whereby said collar means engages the wall of the hole more deeply proximally than distally.

7. An expansion wedge anchor as defined in claim 6, wherein said collar means defines a longitudinal split for each said leg means.

8. An expansion wedge anchor as defined in claim 7, wherein said expansion means comprise two diametrically opposed leg means, said collar means comprising two splits and thereby forming two distinct segments each connected to a respective leg means.

9. An expansion wedge anchor as defined in claim 7, wherein said expansion means comprise three equidistant leg means, said collar means comprising three splits and thereby forming three similar distinct segments each connected to a respective leg means.

10. An expansion wedge anchor as defined in claim 7, wherein at each said split, facing edges of said collar means define cooperating mating means.

11. An expansion wedge anchor as defined in claim 10, wherein said cooperating mating means comprise tongue and groove elements provided transversally on respective ones of said facing edges.

12. An expansion wedge anchor as defined in claim 6, wherein said flaring means define a recessed longitudinal guide for each said leg means for preventing said expansion means from rotating with respect to said expander means.

13. An expansion wedge anchor as defined in claim 6, wherein each said leg means is provided with a reinforcement, and wherein said leading support comprises a concave distal land.

14. An expansion wedge anchor as defined in claim 6, wherein each said leg means defines rounded merging areas where joining said collar means and said leading support.

15. An expansion wedge anchor for insertion in a hole delimited by a wall, comprising an expander means and an expansion means, said expansion means being provided at a leading end of said expander means, said expander means comprising flaring means, said expansion means being expandable at a trailing end thereof and being adapted to engage the wall of the hole, when said expander means is positioned in the hole, wherein upon longitudinal withdrawal of said expander means from the hole, said expander means displaces longitudinally relative to said expansion means with said flaring means thereof gradually causing said trailing end of said expansion means to expand, whereby a trailing edge of said expansion means engages the wall of the hole, said expander means comprising a threaded section proximally of said flaring means, said flaring means comprising a trailing flared portion which tapers away from said threaded section and which is adapted to expand said trailing end of said expansion means such that said trailing edge thereof engages the wall of the hole, wherein said expansion means is adapted to rotate with said expander means, whereby upon rotation of said expander means said trailing edge of said expansion means defines an undercut in the wall of the hole and subsequently remains lodged in said undercut.

16. An expansion wedge anchor as defined in claim 15, wherein said flaring means further comprise an intermediate portion being provided distally of said trailing flared portion and having a diameter less than that of said threaded section, said intermediate portion providing space to accommodate outwardly thereof at least part said expansion means in a collapsed position thereof at least for during insertion of said anchor in the hole.

17. An expansion wedge anchor as defined in claim 15, wherein said expander means comprise proximally, for access outside of the hole when said expansion means is located in the hole, a drive means engageable by a tool for rotating said expander means and said expansion means.

18. An expansion wedge anchor as defined in claim 15, wherein said expander means further comprises a leading flared portion tapering towards said threaded section, said intermediate portion extending between said leading and trailing flared portions, wherein said leading flared portion is adapted to expand a leading end of said expansion means.

19. An expansion wedge anchor as defined in claim 18, wherein, once said undercut has been formed in the wall of the hole by a rotation of said trailing edge, said expander means is adapted to be longitudinally withdrawn from the hole such that said leading flared portion engages and expands said leading end of said expansion means such as to engage the hole, a leading edge of said leading end of said expansion means extending into the wall.

20. An expansion wedge anchor as defined in claim 19, wherein said leading end of said expansion means extends at an angle with respect to the longitudinal axis of said expander means and so engages the wall of the hole.

21. An expansion wedge anchor as defined in claim 18, wherein said expansion means comprise an expandable collar means defining said trailing and leading ends and said trailing and leading edges, a leading support provided distally of said collar means, and at least one leg means extending outwardly of said expander means and connecting said collar means to said leading support, said collar means being adapted to be outwardly expanded by said trailing flared portion wherein said trailing end of said collar means is angled relative to a longitudinal axis of the hole, said collar means being adapted to be outwardly expanded by said leading flared portion wherein said leading end of said collar means is angled relative to the longitudinal axis of the hole.

22. An expansion wedge anchor as defined in claim 21, wherein said collar means defines at least one longitudinal split.

23. An expansion wedge anchor as defined in claim 22, wherein said expansion means comprise two diametrically opposed leg means, said collar means comprising two splits and thereby forming two distinct segments each connected to a respective leg means.

24. An expansion wedge anchor as defined in claim 21, wherein said leading and trailing flared portions of said expander means define leading and trailing recessed longitudinal guides which respectively engage said leg means and tab means provided proximally at said trailing end of said expansion means, thereby preventing said expansion means from rotating with respect to said expander means.

25. An expansion wedge anchor as defined in claim 21, wherein each said leg means is provided with a reinforcement, and wherein said leading support comprises a low friction leading end.

26. A method of setting an expansion wedge anchor in a hole delimited by a wall, comprising the steps of: (a) providing an expander member and an expansion member; and (b) displacing said expander member such as to cause a trailing end of said expansion member to engage the wall of the hole, wherein in step (b) said trailing end is expanded such as to extend at an angle with respect to a longitudinal axis of said expander member.

27. A method as defined in claim 26, wherein after step (b), step (c) consists of rotating said expander member and said expansion member from outside of the hole such that the trailing end of said expansion member forms an undercut in the wall of the hole and remains lodged therein.

28. A method as defined in claim 27, wherein after step (c), step (d) consists of displacing said expander member relative to said expansion member such as to cause a leading end of said expansion member to engage the wall of the hole.

\* \* \* \* \*